United States Patent [19]

Schiffman

[11] 4,141,145
[45] Feb. 27, 1979

[54] METHOD AND APPARATUS FOR PRODUCING EVIDENT PERMANENT SURFACE MARKINGS ON A GLAZED SURFACE

[75] Inventor: Murray M. Schiffman, Westport, Conn.

[73] Assignee: MBI, Inc., Fairfield, Conn.

[21] Appl. No.: 828,424

[22] Filed: Aug. 29, 1977

[51] Int. Cl.² .............................................. B43L 13/10
[52] U.S. Cl. .................................................. 33/25 R
[58] Field of Search ................... 33/18 R, 25 R, 25 B, 33/21, 23 R, 22; 401/49, 19, 29; 118/73

[56] References Cited
U.S. PATENT DOCUMENTS

| 511,468 | 12/1893 | Sillich | 401/49 |
| 2,481,658 | 9/1949 | Gruettner | 33/22 |

OTHER PUBLICATIONS

Textbook, "Technical Drawing", Giesecke – Mitchell – Spencer, pp. 34 & 35.

*Primary Examiner*—Harry N. Haroian
*Attorney, Agent, or Firm*—Cooper, Dunham, Clark, Griffin & Moran

[57] ABSTRACT

Method and apparatus for producing evident permanent surface markings, such as for serializing, hall-marking, identifying and/or personalizing, on a glazed surface without refiring or piercing the surface, by metal deposition and bonding from a guided contacting metal writing rod. The marking material is transferred from the writing rod and bonded to the glazed surface by progressively applying the pointed end of such rod of bondable metal to the moistened glazed surface through the desired marking pattern with sufficient pressure and motion rate to produce an evident marking.

1 Claim, 1 Drawing Figure

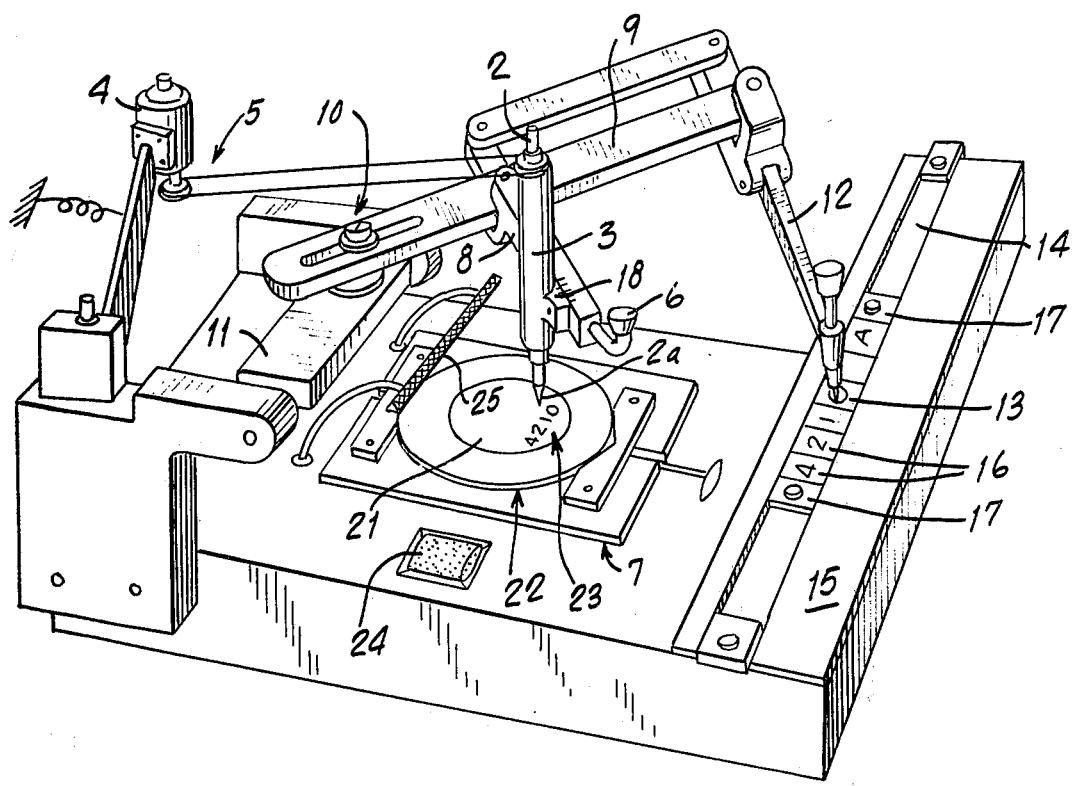

METHOD AND APPARATUS FOR PRODUCING EVIDENT PERMANENT SURFACE MARKINGS ON A GLAZED SURFACE

BACKGROUND OF THE INVENTION

The present invention relates to the production of evident permanent surface markings of a prescribed pattern, such as for serializing, hall-marking, identifying and/or personalizing, on a glazed surface without the need for refiring or piercing the surface. More particularly, the invention relates to method and apparatus for guiding a pointed bondable metal writing rod through a prescribed marking pattern in contact with a moistened glazed surface with sufficient pressure and motion rate to effect an evident transfer and bonding of material from the rod to the surface in the desired pattern.

Permanent markings for such purposes have been produced on already glazed surfaces by applying conventional marking or coloring material in the desired pattern and then firing or heating such area sufficiently for bonding to occur. However, this procedure is limited by available facilities, additional cost, and the extent and manner in which such firing or heating can be effected without marring the glazed object or existing design thereon.

Without such heating, glazed surfaces are relatively impervious and resist permanent open-surface bonding by conventional inks, paints and adhesives, which can be removed by scraping, abrasives, solvents or simply washing. Markings for serializing or individualizing a glazed item may be applied prior to glazing, and thus under the glaze for permanence. However, this method does not afford the flexibility of an after-glaze marking, and presents the problem of numerous gaps in a production run of items having sequential serial numbers, for example, as a result of breakage and rejects.

Labels or markers may be affixed relatively permanently, but these may look unnatural or unseemly in comparison to a direct marking, and may be subject to removal or defacing.

It is also known to engrave markings into glazed surfaces. However, while such markings are permanent, they may not be apparent unless they are relatively deep and/or filled in with a coloring material. The resultant breaking of the glaze leaves the underlying absorbent ceramic subject to contamination and is unacceptable to most producers of glazeware.

SUMMARY OF THE INVENTION

It is a primary object of this invention to provide a method of producing a prescribed evident permanent surface marking, such as for serializing, hall-marking, identifying and/or personalizing, on a glazed surface without firing or piercing the surface.

It is another object of this invention to provide a useful means for producing such markings in a readily repeatable manner as for a production run on each of many pieces of the same shape and dimensions.

Another object is to provide apparatus for readily producing such markings on differently proportioned objects.

The method of the present invention provides a means for positioning and holding the glazed object for marking, and adjustable and variable means for guiding the marking point through any of a variety of prescribed patterns with sufficient pressure and motion rate on a preferably moistened glazed surface to allow transfer and bonding of an evident amount of marking metal from the point to the surface in the desired pattern shape, size and position.

In the apparatus of the invention a prescribed pattern is formed by selecting and clamping assorted stencil elements from any of a store of numeric and/or alpha characters, hallmarks, signatures, etc., in a desired sequence and position to a guide surface. The glazed object is placed in position to be marked in a suitable holding fixture, and then preferably moistened to facilitate marking. A stylus attached to a proportioning mechanism, such as a pantograph in an engraving machine, is moved through the composite stencil path, causing the pointed bondable-metal marking tool to move through the desired path in the preset proportion and position. A lever attached to move the tool up and down is used to provide contact and pressure as necessary. Motion rate of the tool, which also facilitates marking, may be provided by rotating the tool by motor means and/or by sliding the tool back and forth in accordance with the stencil path. The marking tool pointedness should be maintained for consistency and also to facilitate and accommodate for material transfer from the marking tool, by frequent sharpening. If the tool is rotated by motor means, applying a file at a suitable angle, such as a triangular file, prior to marking each glazed object, will accomplish this purpose.

BRIEF DESCRIPTION OF THE DRAWINGS

FIG. 1 is a perspective view of apparatus for producing evident permanent surface markings on a glazed surface in a prescribed pattern and position.

DETAILED DESCRIPTION

Generally, adhesion of a marking material to a surface is enhanced by the porosity, roughness and ease of wetting of the surface. Thus, a glazed surface, which is non-porous, very smooth, and resists wetting, is extremely difficult to mark in a permanent manner without firing. Where permanent serializing or other individualizing has been required, it has generally been done either prior to glazing or by firing after glazing, causing the marking to be infused with the glaze. However, these approaches limit flexibility and may cause numerous gaps in serializing as a result of breakage and rejects.

Permanent, evident marking of a glazed surface is accomplished in accordance with the present invention by using a metal susceptible to transfer to glaze, such as titanium or aluminum, in a form and manner that promotes ready transfer and strong adhesion. Thus, the application of a point or edge of such material, which is ductile and has a valence complementary to that of glaze, with sufficient pressure and motion rate to a glazed surface, which is preferably wetted as it is believed the moisture produces molecular charge polarization and controls the surface heat generated by tool pressure and motion, effects such transfer and adhesion. In addition, means for readily guiding such a point or edge in this manner through a prescribed path permits the permanent evident marking of a desired pattern on a glazed surface without firing.

Referring to FIG. 1 of the drawings, an engraving machine 1 of a conventional pantographic type is adapted for evident permanent marking on a glazed surface. A metal rod 2 of titanium or aluminum, having a point 2a, which serves as the marking tool, is inserted in tool-holder 3. Said tool 2 may be rotated by motor 4 and pulleys and belts 5, which motion promotes transfer of marking material from tool 2 to glazed surface 21 on glazed object 22, which is held and adjustably positioned by clamping fixture 7. Tool-holder 3 is positioned on tool-arm 8 at an adjustable distance from pantography cross-arm 9, which in turn is adjustably attached to trunion 11. A pivotable stylus arm 12 also attached to cross-arm 9 holds a stylus point 13. A stencil holder 14 is adjustably clamped to guide surface 15, and contains stencil elements 16, which are held in position by clamps 17.

Stylus point 13 is pressed into and around stencil elements 16, causing tool point 2a to move through a similar path proportionally reduced in accordance with the ratio set by the tool-arm 8 distance adjustment means 18, and cross-arm 9 position adjustment means 10 on trunion 11, in pantographic fashion, as will be understood by those skilled in the art.

After sharpening point 2a of rotating tool 2 against triangular file 25 and wetting glazed surface 21 with a suitable wetting agent such as water from a wet sponge 24 in preparation for prescribed marking, stencil point 13 is positioned in stencil element 16 and lever 6 is pushed down until tool point 2a is pressed against glazed surface 21 with sufficient pressure to generate an evident marking pattern 23 as stylus point 13 is moved through stencil elements 16.

The metal will be transferred from the tool point 2a and adhere or bond to the surface of the glaze by means of a frictional effect produced through the use of a proper combination of pressure and motion rate for the particular metal used. The motion of the point 2a need not be rotational but may alternatively be translational or oscillatory, and the skilled engraver will quickly determine the proper pressure and rate of motion parameters for a particular metal in a given application. Titanium and aluminum have been found to be particularly suitable metals, while lead, copper and iron have been found to be unsatisfactory, when using water as the wetting agent with conventional glaze.

The tool guidance and/or motion may be facilitated or automated in various ways, if desired, as for high production applications. For example, a rotatable number dial or dials may be substituted for one or more of the stencil elements 16 in a serial number to be applied to the pieces. Such a dial or set of dials may then be positioned as to character selected either manually or under motor control as determined by keyboard or numerical control tape input. Further, the tool motion and/or pressure may be controlled to either follow the stencil path or an otherwise prescribed path which has been sequentially prerecorded or taken from a memory bank in conformance with an associated controller as known to those skilled in the art.

The above descriptions are intended to be illustrative of methods for producing evident permanent surface markings on a glazed surface without the need for firing and should not be construed to be limiting, as various combinations of metals, wetting agents, pressure and motion rate parameters, as well as apparatus modifications may be found suitable within the purview of the invention by those skilled in the art. The present invention has substantial use in the production of ceramic plates, bowls, cups, bells, jewelry and other giftware and collectibles having a requirement for after glaze marking, such as for serializing, hall-marking, identifying and/or personalizing. Many other uses of the invention will be apparent to those working in this and related fields.

I claim:

1. Method for producing evident permanent surface markings on a glazed surface without scoring or preheating the surface comprising the steps of:
    disposing, in one arm of a pantograph, a body of a metal selected from the group consisting of titanium and aluminum, said body having a comparatively sharply pointed end;
    fixing the glazed surface to be marked beneath said pointed end and wetting the portion of the glazed surface to be marked with water;
    rotating said body and bringing the rotating pointed end into contact with said wetted surface to a selected contact pressure; and
    moving the other arm of said pantograph, through a pattern to be marked on said surface, at a selected rate to cause an evident amount of said metal to be transferred from said pointed end and bonded to said surface without scoring it.

* * * * *